Nov. 1, 1966   H. A. WOOD ETAL   3,282,429
OIL FILTER ASSEMBLY WITH REPLACEABLE ELEMENT
Filed Dec. 5, 1963
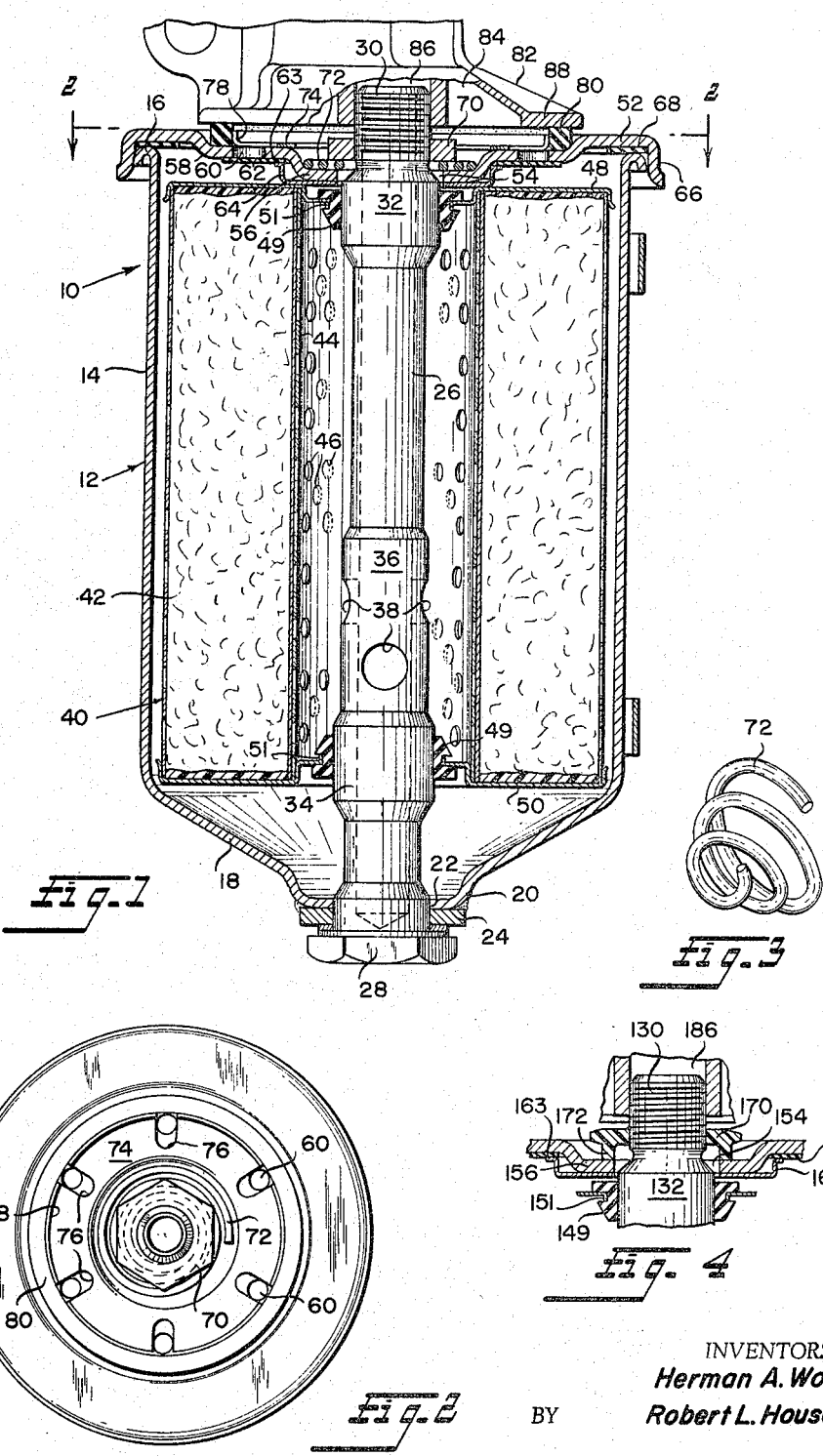
INVENTORS
Herman A. Wood
Robert L. Houser
BY
Frank J. Soucek

United States Patent Office 3,282,429
Patented Nov. 1, 1966

3,282,429
OIL FILTER ASSEMBLY WITH REPLACEABLE ELEMENT
Herman A. Wood and Robert L. Houser, Flint, Mich., assignors to General Motors Corporation, Detroit, Mich., a corporation of Delaware
Filed Dec. 5, 1963, Ser. No. 328,348
3 Claims. (Cl. 210—136)

This invention relates generally to an oil filter assembly and more particularly to a detachably mounted cartridge type oil filter assembly.

Oil filters are generally standard equipment on all automotive internal combustion engines. A cartridge type oil filter assembly is more desirable from a maintenance cost standpoint because the filter housing may be reused with a new filter cartridge when the filter cartridge has become contaminated.

One of the problems associated with the cartridge type oil filter assembly is caused by the presence of oil in the assembly when the need to replace the filter cartridge arises. This presence of oil leaves one with the option of changing the filter cartridge with the filter assembly attached to the engine or of removing the filter assembly to a more convenient work area and having the oil present in the assembly leak out onto the floor or onto the mechanic.

Heretofore no attempt has been made to rectify this situation and, accordingly, it is an object of this invention to provide a detachably mounted cartridge type oil filter assembly which may be removed to a working area without oil leakage from the filter assembly.

Another object of the invention is to provide an oil filter assembly which may be removed from an engine and transported to a working area as a fluid tight unit.

With these and other objects in view, the invention comprises the arrangements, constructions and combinations of the various elements described in the specification as well as those stated in the claims and illustrated in the accompanying drawings, in which:

FIGURE 1 is a cross-sectional side view of an oil filter assembly embodying the present invention.

FIGURE 2 is a section of the oil filter assembly embodying the present invention taken on the line 2—2 of FIGURE 1 in the direction of the arrows and with parts removed.

FIGURE 3 is a perspective view of a spring element used in the combination of the invention.

FIGURE 4 is a partial cross sectional side view of an oil filter assembly embodying a modification of the present invention.

Referring now to the drawings, wherein like reference characters designate like or corresponding parts throughout the several views, FIGURE 1 illustrates a preferred embodiment of the invention including an oil filter assembly indicated generally at 10. The oil filter assembly 10 comprises a casing 12 having a cylindrical side wall 14, the upper edge of which terminates in a semi-circular flange 16. Integral with the bottom edge of cylindrical side wall 14 is a frusto-conical section 18 having a central dished flat portion 20 which is apertured at 22. An annular reinforcing member 24 having an aperture which coincides with the aperture 22 is welded to the outer surface of the dished portion 20 of casing 12.

Mounted within the aperture 22 is a central stud 26. The lower end of the stud terminates in a hexagonal head 28 while the upper end 30 is threaded. The stud 26 is also provided with an upper collar portion 32 and a lower collar portion 34. An axial bore 36 extends from the upper end 30 of the stud 26 to a point spaced below the lower collar 34 but above hexagonal head 28 of the stud 26. A plurality of transverse bores 38 extend from the circumferential surface of stud 26 to axial bore 36.

Disposed within the casing 12 and slidably mounted on stud 26 is a filter cartridge 40 comprising an annular filter element 42, an inner cylindrical metallic sleeve 44 provided with a plurality of apertures 46, and upper and lower annular metallic mounting members 48 and 50. The mounting members 48 and 50 both carry rubber grommets 49 in their respective central apertures 51 which engage collars 32 and 34 on stud 26, respectively.

The oil filter assembly 10 further comprises a closure cover 52 which is a circular metallic member having a central aperture 54 through which the upper end 30 of stud 26 extends. Immediately adjacent aperture 54 is a first dished portion 56. Adjacent the first dished portion 56 is an intermediate dished portion 58 having a plurality of equally circumferentially spaced apertures 60 as best seen in FIGURE 2. An annular member 62 of resilient material is disposed on the inner surface of the intermediate dished portion 58 adjacent apertures 60. The inner circumferential edge 63 of the resilient member 62 is held in place by a sheet metal support member 64 which is clamped between closure cover 52 and filter cartridge 40. Since only the inner edge is secured, the annular resilient member 62 acts as a one-way valve for the apertures 60 allowing flow into casing 12 and blocking flow therefrom.

The outer edge of cover 52 terminates in an integral downwardly extending flange 66 which surrounds semi-circular flange 16 on casing 12. Disposed between semi-circular flange 16 and cover 52 is an annular sealing gasket 68 of resilient material.

Threadably mounted on the upper end 30 of stud 26 is a nut 70 which serves as an abutment means for the upper end of a spiraled coil spring 72 that in turn is disposed on the upper surface of dished portion 56 of closure cover 52. The spiraled coil spring 72 is shown more clearly in its extended or unbiased condition in FIGURE 3.

Disposed on the upper surface of the intermediate dished portion 58 of closure cover 52 in an annular sheet metal spacer member 74 provided with a plurality of circumferential spaced radial slots 76, as shown in FIGURE 2, which coincide with apertures 60 in the closure cover. The outer edge of spacer member 74 terminates in an upturned flange 78. A ring gasket 80 of substantially square cross section is disposed between closure cover 52 and an internal combustion engine 82, a portion only of which is shown in FIGURE 1, onto which the filter assembly 10 is threadably mounted. The inner circumference of ring gasket 80 abuts the upturned flange 78 on spacer member 74 to prevent any lateral movement thereof.

The engine 82, a portion only of which is shown, is provided with an annular oil outlet 84 and an inlet bore 86. End 30 of stud 26 is threadably engaged within bore 86 so that gasket 80 is tightly engaged between engine flange 88 and intermediate dished portion 58 of cover 52. Thus fastening of oil assembly 10 to engine 82 provides a fluid tight seal therebetween as well as establishes fluid communication between annular engine outlet 84 and apertures 60 in cover 52 and between outlet bore 36 in stud 26 and inlet bore 86 of engine 84.

From the foregoing description it is readily apparent that when the filter assembly 10 is in place as shown in FIGURE 1, oil will flow from the annular outlet 84 in engine 82 through the apertures 60 past the annular one-way valve 62 into the filter assembly; the ring gasket 80 preventing any leakage between the assembly 10 and the engine 82. Once in the filter assembly 10, the oil flows through the filter cartridge 40 and into the axial bore 36 of stud 26 via the traverse bores 38. From the axial bore 36 of stud 26 the oil returns to inlet bore 86 of engine 82.

Should the filter cartridge require replacement, the upper end 30 of the stud 26 is threadably disengaged from engine 82 allowing removal of the filter assembly 10. The filter assembly 10. The filter assembly 10 thus removed remains a fluid-tight sealed unit since the closure cover 52 remains in sealed engagement with the casing 12 due to compressive action of spring 72 and also the one-way valving action of annular member 62 which prevents back flow through apertures 60. After the filter assembly has been placed in a convenient working area such as a workbench, the cover 52 may then be removed and the filter cartridge 40 replaced.

Referring now to FIGURE 4, a modification of the present invention is illustrated. The nut 70 and spiraled coil spring 72 of the embodiment shown in FIGURE 1 have been replaced by a resilient nut 170 having an annular axially extending compressive collar portion 172 integral therewith. The nut 170 and integral collar portion 172 are made of an elastically deformable, yieldable material such as "Nylon." The nut 170 is also provided with undersized threads to provide a better seal between it and central stud 132. The function of resilient nut 170 and collar 172 is identical to that of the nut 70 and coil spring 72 of the previously described embodiment. The resilient nut 170 is threadably mounted on the upper end 130 of central stud 132 and serves as an upper abutment means for the integral collar member 172 which is compressed between it and closure cover 156. Due to the resilience of the nut 170 and integral collar 172, the closure cover 156 is constantly urged into sealing engagement with the upper semi-circular flange 16 of casing 12 (shown in FIGURE 1). As in the previous embodiment, the filter assembly has the upper end 130 of its central stud threadably mounted within an inlet bore 186 of an internal combustion engine to establish fluid communication between the filter assembly and the lubrication system of the internal combustion engine.

Thus, it will readily be appreciated that both embodiments of the present invention provide a detachably mounted cartridge type oil filter assembly which may be removed to a feasible working area to replace the filter cartridge therein without any oil leakage from the filter assembly. It is apparent that the filter assembly incorporating the nut 170 may be mounted in an inverted position without oil seepage since the deformable nut provides for a positive seal between the cover 156 and the nut itself, as well as between the threads of the nut and center stud.

It should be understood, of course, that the foregoing disclosure relates only to preferred embodiments of the invention and that it is intended to cover all changes and modifications of the examples of the invention herein chosen for the purposes of the disclosure, which do not constitute departures from the spirit and the scope of the invention.

What is claimed is:

1. In a detachably mounted cartridge type fluid filter assembly, a casing, a filter cartridge disposed within said casing, a closure cover for said casing, inlet means in said closure cover, one-way valving means in said inlet means, a stud mounted at one end of said casing and extending through said closure cover, mounting means at the opposite end of said stud for mounting said filter assembly to an interal combustion engine, outlet means in said stud, abutment means on said stud between said mounting means and the outer surface of said closure cover, and a spiraled coiled compression spring between said abutment means and said closure cover whereby said filter assembly may be detached from said internal combustion engine as a fluid tight unit.

2. In a detachably mounted cartridge type fluid filter assembly, an open casing and a closure cover, a filter cartridge disposed within said casing, inlet means in said closure cover, one-way valving means in said inlet means, a stud mounted at one end of said casing opposite the opening and extending through said closure cover, mounting means at the opposite end of said stud for mounting said filter to an internal combustion engine, outlet means in said stud, and abutment means on said stud including resilient compressive means to urge said closure cover into sealing engagement with said casing whereby said filter assembly may be detached from said internal combustion engine as a fluid tight unit.

3. The combination as recited in claim 2 wherein said resilient compressive means comprises an elastically deformable nut threaded on said stud and provided with an annular integral collar that engages said cover in the area around said stud.

References Cited by the Examiner

UNITED STATES PATENTS

| | | | |
|---|---|---|---|
| 3,061,106 | 10/1962 | Bradbury | 210—454 X |
| 3,066,803 | 12/1962 | Seils | 210—168 |
| 3,085,688 | 4/1963 | Eberle | 210—440 X |

FOREIGN PATENTS 1,302,232    7/1962    France.

REUBEN FRIEDMAN, *Primary Examiner.*

F. A. SPEAR, *Assistant Examiner.*